J. E. HALLADAY.
Making Cement-Lined Pipes.

No. 154,245.                    Patented Aug. 18, 1874.

WITNESSES.
Boyd Eliot
Philip O'Reilly

John E. Halladay
INVENTOR.

UNITED STATES PATENT OFFICE.

JOHN E. HALLADAY, OF JERSEY CITY, NEW JERSEY.

IMPROVEMENT IN MAKING CEMENT-LINED PIPES.

Specification forming part of Letters Patent No. 154,245, dated August 18, 1874; application filed April 13, 1874.

*To all whom it may concern:*

Be it known that I, JOHN E. HALLADAY, of Jersey City, of Hudson county and State of New Jersey, have invented certain Improvements in Making Cement-Lined Pipes for water, &c., of which the following is a specification:

This invention pertains to the class of articles used for conducting water and other liquids under pressure, and in which a cylinder or tube of metal is lined or coated on the inner side with a cement to protect the metal, as well as preserve the liquid from contact with it, and also to furnish additional strength to the pipe.

The invention consists of a novel combination of parts for imparting a rising and a rotary motion to the spindle of a machine for making cement-lined pipes, which will be hereinafter described and claimed.

Figure 1:
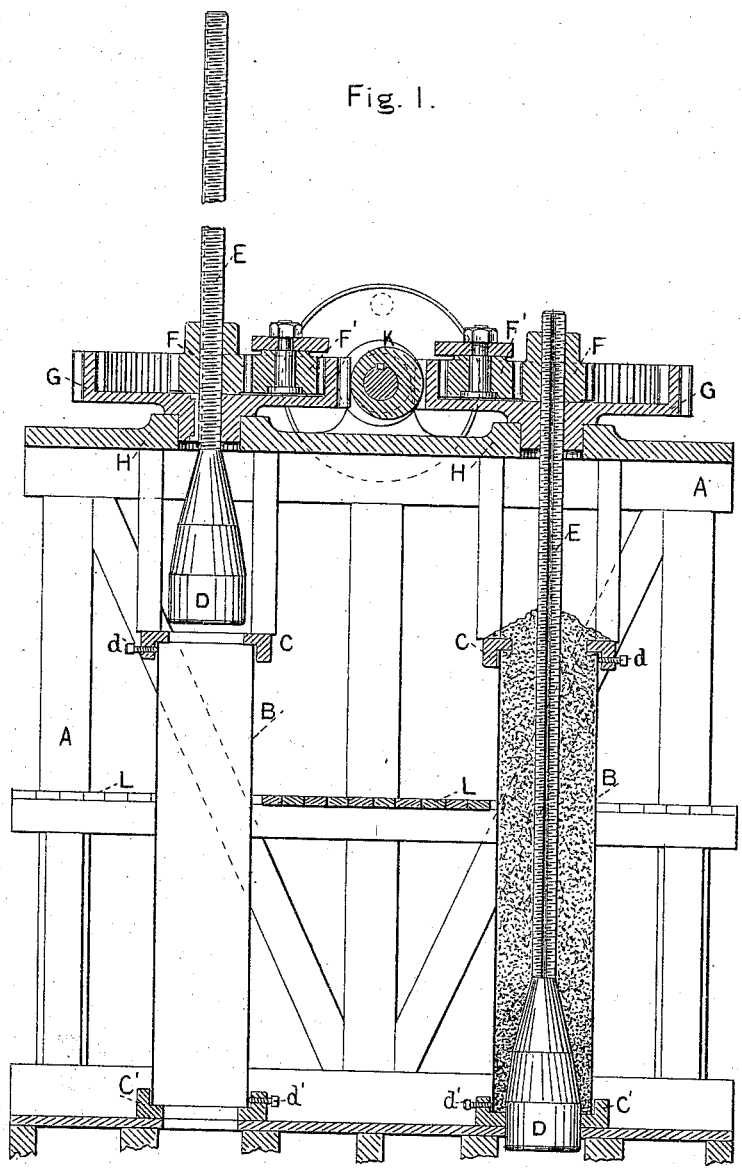
Figure 2:
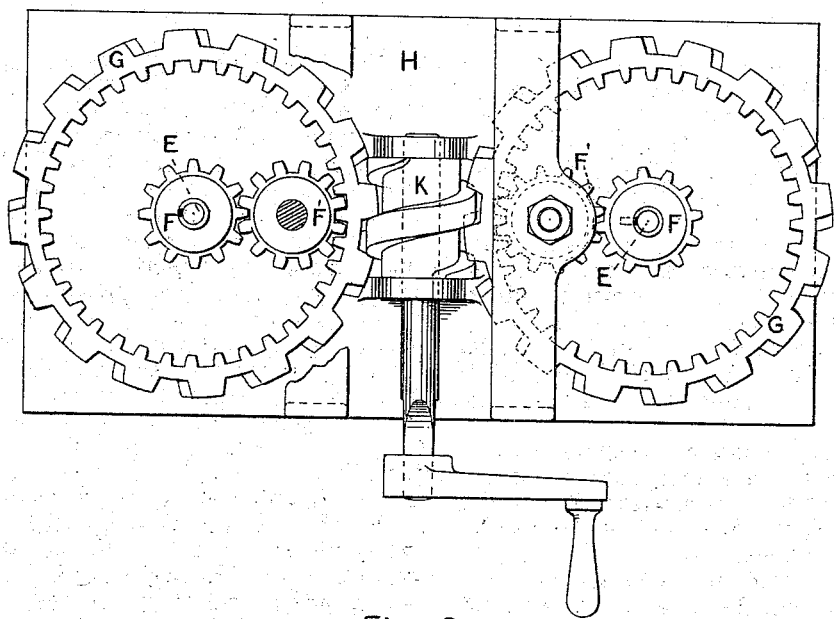
Figure 3:
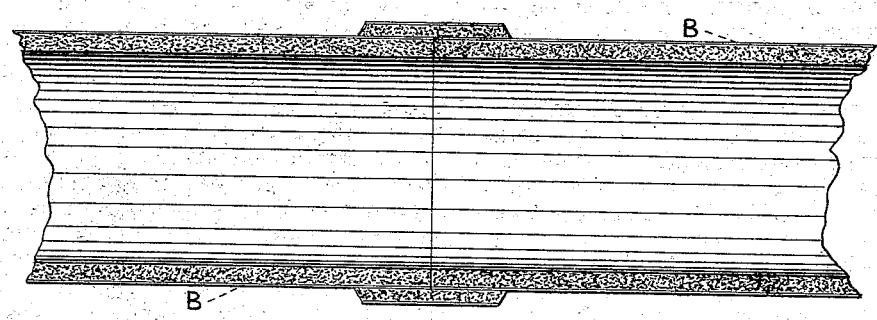

Figure 1 is a sectional elevation of a machine for operating the cores or tools for lining metal pipes with cement, and shows two tubes or pipes in position, one receiving the core preparatory to being lined, and the other in the act of filling, or with the tool or core being drawn through it to line it. Fig. 2 is a plan or top view of the driving mechanism of said machine; and Fig. 3 is a longitudinal section of two portions of a pipe complete and abutted together, as seen when laid with a cement-sleeve around it. The mechanism here shown is for a double machine, which, when one pipe is being lined the other is made ready and both parts are operated by one driver or gear, but the operation may be performed by one core and its driving gear alone, if desired.

Upon any suitable frame-work, as at A, is mounted and held in a firm position a pipe, as at B, to be filled with cement. Said pipe B is provided at the bottom and the top with guides or collars C C' fastened thereon with set-screws, as at d d', or in other convenient manner, and said collars serve to determine, in connection with the core, the thickness of the lining or the cement, as they are formed to cover the ends of the pipe, except where the core passes through them. The core is formed of metal, as of cast-iron, and is of conical form, as at D, except the lower portion, which is cylindrical to complete or finish the inner surface of the pipe, and said core is attached to a rod or shaft, as at E, which is suspended at its upper end in a screw-nut, as at F, which is concentric with a toothed-wheel, G, the hub of which works in a plate upon the top of the machine or the frame-work, as at H. Said screw-nut F has pinion-teeth on its outer perimeter that gear with a second pinion, F', which engages with teeth on the interior of a flanged rim upon the upper surface of the toothed wheel G. At K is a worm mounted in bearings upon the top of the frame, and it engages with the toothed-wheel G, and, if desired, with a corresponding wheel and pinions on the opposite side, so that motion may be given by the same worm to two cores at the same time. The core-shaft or rod, to which the core is fastened, extends through the hub of the wheel G and fits snugly therein, but so as to work up and down through it, and in said hub is inserted a spline or key to fit in a corresponding groove in the rod E, or vice versa, as desired, but to such a length as to correspond with the greatest length of pipes to be lined, so that, as the pinion-nut F turns to raise the core through the pipe the large wheel G will revolve the core on its axis to sweep or trowel the cement as it is pressed against the metal pipe, and thereby give it a smooth and hard finish during the passage of the core through the pipe. Motion may be communicated either by crank or belt or gearing to the worm K, and when the core or tool D is lowered to the bottom of the metal-pipe, as shown in Fig. 1, and the cylindrical portion is allowed to extend below the collar E, as there shown, the pipe is then filled with cement by the workmen standing on a platform, as at L, and when the pipe is filled the upper collar is fastened, if not previously done, in order to prevent the core from lifting out all the cement. Then the machine is reversed and the screw-nut F' on the rod or shaft E begins to draw or lift the core D, which slowly but gradually carries before it all the surplus material that is not required to fill the space between the core and the metal pipe, and at the same time a torsional motion is given to the core on its own axis, whereby the operation of lining the pipe is completed as soon as the core has passed through it or through any given portion of it. When two cores are combined in the same machine one may be descending into the pipe while the other is operating upon the cement in a second pipe, as here shown, and this saves the time of the workmen for one to be completed before another can be commenced. This, however, is not essential to the working of this invention, as one core so mounted as to have a rotary motion on its own axis while it is drawn or forced through the metal pipe, will perform the operation as completely as two.

I therefore claim—

1. In a machine for lining metal pipes with cement, the combination of two cores and intermediate gearing, whereby when one tube or pipe is being lined the other is prepared for the operation, substantially as described.

2. The combination, with the spindle of the machine for making cement-lined pipes, of the pinion-nut F, pinion F', driving-wheel G, and worm K, the whole constructed to operate for imparting a vertical and a rotary movement to the spindles, substantially as and for the purpose described.

JOHN E. HALLADAY.

Witnesses:
BOYD ELLIOT,
PHILIP O'REILLY.